Figure 1:
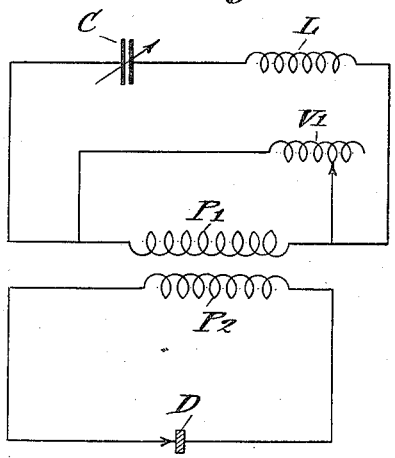

R. H. RENDAHL.
COUPLING FOR ELECTRICAL OSCILLATION CIRCUITS.
APPLICATION FILED SEPT. 7, 1911.

1,175,472. Patented Mar. 14, 1916.

Inventor:
Ragnar Håkan Rendahl
By Knight Bros.
his Attorneys

UNITED STATES PATENT OFFICE.

RAGNAR HÅKAN RENDAHL, OF LILJEHOLMEN, NEAR STOCKHOLM, SWEDEN, ASSIGNOR TO GESELLSCHAFT FUER DRAHTLOSE TELEGRAPHIE, M. B. H., OF BERLIN, GERMANY.

COUPLING FOR ELECTRICAL OSCILLATION-CIRCUITS.

1,175,472.   Specification of Letters Patent.   Patented Mar. 14, 1916.

Application filed September 7, 1911. Serial No. 648,241.

*To all whom it may concern:*

Be it known that I, RAGNAR HÅKAN RENDAHL, a subject of the King of Sweden, and residing at Liljeholmen, near Stockholm, Sweden, have invented certain new and useful Improvements in Couplings for Electrical Oscillation - Circuits, of which the following is a specification.

This invention has for its object an arrangement for connecting an electric oscillation circuit with apparatus which may consist substantially of an ohmic resistance or which will act as such, e. g. apparatus such as wire instruments, microphones and more particularly detectors such as are employed in wireless telegraphy and telephony.

The connection of such apparatus with oscillation circuits by means of a transformer or by a similar inductive method of coupling, is well known. The coupling arrangements hitherto adapted for this object have, however, the disadvantage that a variation of the degree of coupling of the two parts, produced for instance by varying the energy transmission from the oscillation circuit to the apparatus, also is accompanied by a variation in the periodicity of the oscillation circuit.

In receiver circuit arrangements for wireless telegraphy and telephony, it is frequently necessary to vary the energy transmitted from the aerial to the detector, or in other words, to vary the coupling between the aerial and the detector circuit, or also which amounts to the same to more or less dampen a receiver circuit through the detector.

Various means have been employed heretofore to obtain this result as well in so-called direct or conductive connections as also in inductive connections between the antenna circuit and the receiver circuit. All these means, however (some of which are for instance the varying of the effective turns of a coupling coil or also shifting of the two transformer coils relatively to each other), have the result that the receiver circuit varies its own periodicity, because when the coupling is varied, the inductance of this circuit is varied with it. Therefore it has always been necessary heretofore to retune the circuit by means of the tuning device of the antennæ. Applicant has now found by experiment that this undesired reaction is due to the large magnetic stray flux which exists in all coupling arrangements heretofore employed for this purpose.

It is the object of the present invention to avoid all the disadvantages pointed out above, and also to arrange the coupling of the detector circuit so that the means by which the coupling is brought about do not have any undesirable influence on the oscillation circuit, so that the dampening may be varied at will by means of the detector without requiring a subsequent retuning. This is attained by the combination of a detector which constitutes a pure ohmic resistance, with a transformer which has practically no magnetic stray flux. Both of these elements are known in themselves in the art of wireless telegraphy and have been frequently used alone or in combination with other elements but so far as I am aware they have never been used together in a receiver circuit. Transformers with small stray flux have been used for instance by Marconi (see Marconi Patent No. 627,650) but only in arrangements in which a coherer was used as a receiving instrument, which device, as is known, constitutes such a high ohmic resistance so long as not affected by waves, that it acts as a capacity. On the other hand, detectors which are pure ohmic resistances have been used frequently of late but they have only been used in arrangements in which the coupling means have a very large magnetic stray flux.

The effect of using a transformer without stray flux is that the frequency of the tuned circuit remains constant or approximately constant, even if considerable variations in the coupling and transfer of energy are made. To take an example: In the methods of coupling hitherto employed, more particularly by means of transformers, with a variation in the coupling of about 20%, the variation of the wave length of the oscillation circuit amounts to about 10%; on the other hand, when a transformer is used which is free from stray flux, a variation of the coupling by the same amount only causes a variation in the wave length of about ½ to 1%. Wave variations to this extent, may, however, be entirely left out of practical consideration. In consequence of the very small stray flux of the transformer its self-induction, so long as the ohmic resistance is connected, is extremely low and has therefore no appreciable influence on the periodicity of the oscillation circuit. On the other hand, as soon as the ohmic resistance is separated from the transformer, the full self-induction of the coil connected with the oscillation circuit comes into action, and the increasing of the wave length of this oscillation circuit may now amount to 30%.

Various forms of construction of the invention and details of the same are shown diagrammatically in the accompanying drawings:—

Figure 2:
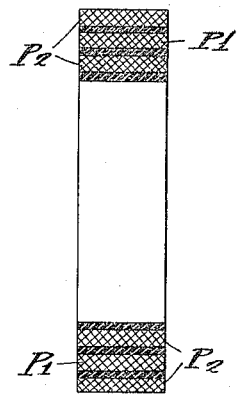
Figure 3:
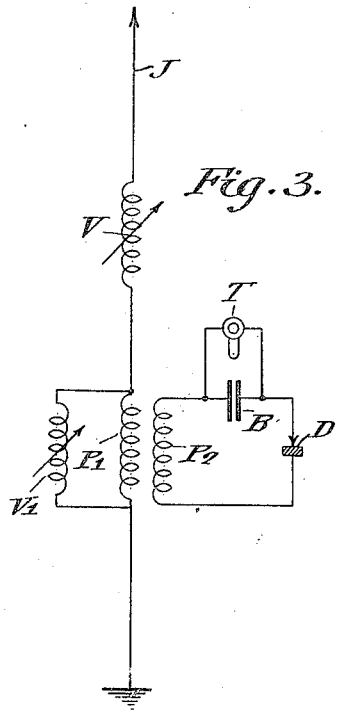
Figure 4:
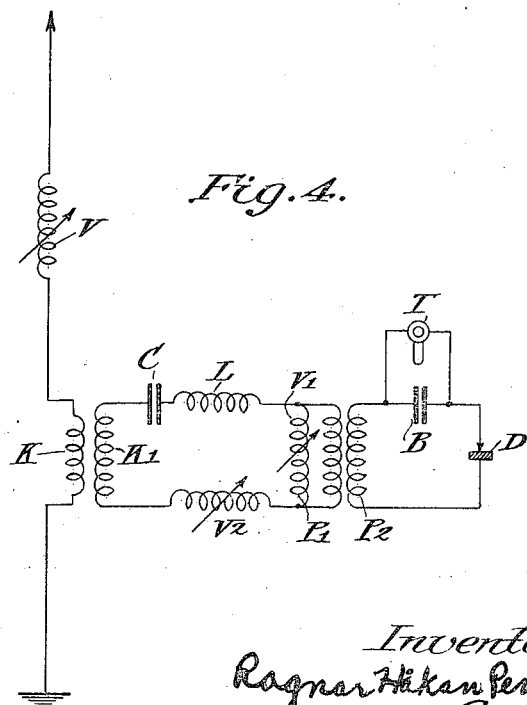

Figure 1 is an example of a simple form of construction of the invention; Fig. 2 is a cross section of a coupling transformer; and Figs. 3 and 4 are different forms of construction of the invention in their application to wireless telegraphy.

In Fig. 1 the oscillation circuit is formed by a condenser C, a self-induction coil L and the primary coil $P_1$, of a transformer which has substantially no stray flux. An apparatus consisting of an ohmic resistance such as a detector D, is connected in series with the secondary coil $P_2$ of the transformer.

In order to make it possible to vary the transmissions of energy from the oscillation circuit to the apparatus without change in the transformer ratio, a suitable variable self-induction, for instance in the form of a variometer $V_1$, is connected in parallel with one of the two transformer coils, for instance as shown, in parallel to the primary coil $P_1$. If in an extreme case, this self-induction $V_1$ is *nil*, that is to say if the primary coil $P_1$ is short-circuited, no transferring of energy to the detector or ohmic resistance D takes place. The other extreme case arises when $V_1$ is opened or is infinitely great when the detector receives the full energy. Owing to the above described arrangement of the transformer, a variation of the number of oscillations in the primary circuit is in practice hardly appreciable, even in these two extreme cases. Within these two limits the transmission of energy may, of course, be very greatly varied.

Any other suitable alternating current resistance may of course be employed instead of the variometer to the same advantage.

In order to obtain the desired very small dispersion in the transformer, it may for instance be wound in a ring form in the manner which is already known for other purposes, as shown in section in Fig. 2. With such a method of winding, in which the primary coil is surrounded on both sides by the windings of the secondary coil, it is possible to obtain, as is well known, the greatest mutual induction with the smallest dispersion. The coil may also be a continuous one and the ratio of transformation may be obtained by tappings, *i. e.* the coil may constitute an auto-transformer. The advantages hereinbefore mentioned only arise, however, as already stated when a practically non-inductive ohmic resistance is connected with the transformer. In the case of coherer connections the coherer capacity is secondary, so that the advantages hereinbefore mentioned cannot possibly be obtained. The improved arrangement is therefore only applicable as a receiver arrangement for detectors which substantially act electrically as ohmic resistances. For these, however, it has extremely important advantages. The action of the transformer is then as follows: When the detector is connected with the secondary coil its resistance must be considered in value equal to its absolute value divided by the square of the transformer ratio, and this resulting value as being directly connected with the primary circuit through the transformer which is free from dispersion. If, for instance, the absolute resistance of the detector amounts to 1000 ohms and the ratio of transformation is 10 to 1, the detector resistance which comes into action in the primary circuit is reduced by the transformer from 1000 ohms to 10 ohms. Efforts have been made in vain for a long time to find a detector, the resistance of which is so low that it can be inserted into the primary oscillation circuit, for instance, the antenna detectors with such a low resistance are insufficiently sensitive. By the present invention whatever detector is used its resistance may act as a low resistance detector inserted into the antenna if a transformer with a suitable ratio of transformation is used. The reduction of the resistance is preferably such that the damping caused by the detector is equal to the damping of the primary circuit at no load. The primary damping will thus generally be doubled.

Fig. 3 shows the simplest practical receiver arrangement according to this invention. The antenna J is connected to earth through a variometer $V_1$, and the primary coil $P_1$ of the transformer, and its periodicity can be varied by the variometer $V_1$. The detector D, and the block condenser B with a telephone T in parallel, are connected in known manner in the circuit of the secondary coil $P_2$ of the transformer. The coupling may be suitably varied by means of the variometer $V_1$, without affecting the tuning. In order to increase the freedom from interruption the connections may also be extended by the coupling of the detector with the antenna through a tuned intermediate or selection circuit (Fig. 4), which circuit is connected through the coupling transformer K $K_1$ with the antenna. The intermediate circuit consists of the secondary coil $K_1$, a fixed condenser C, a fixed self-induction coil L, a variometer $V_2$ and the primary coil $P_1$ of the transformer (without stray flux) connected in parallel with the variometer $V_1$. If the capacity C and the self-induction coil L in the intermediate circuit are equal to the capacity and self-induction of the antenna, and if an antenna-variometer is also used as the variometer in the intermediate circuit, the advantage is obtained that the coupling between the intermediate or selection circuit and the antennæ, i. e. between K and K₁ need not be varied when the wave length is varied, and further the advantage that in working with the selection circuit its variometer has always the same adjustments as the variometer of the aerial wire.

Having now particularly described and ascertained the nature of the said invention and in what manner the same is to be performed, I declare that what I claim is:—

1. In a circuit connection of the character described, the combination with an oscillation circuit and an electric apparatus substantially constituting a non-inductive ohmic resistance; of a high frequency transformer, having its primary and secondary winding arranged in suitable close proximity to practically prevent a stray flux, the primary winding of said transformer being connected with said oscillation circuit and the secondary winding with said apparatus.

2. In a circuit connection of the character described, the combination with an oscillation circuit, and an electric apparatus substantially constituting a non-inductive ohmic resistance; of a high frequency transformer, having its primary and secondary winding arranged in suitable close proximity to practically prevent a stray flux, the primary winding of said transformer being connected with said oscillation circuit and the secondary winding with said apparatus, and a variable alternating current resistance connected in parallel with one of the windings of said transformer.

3. In a circuit connection of the character described, the combination with an oscillation circuit and a circuit containing a detector constituting a non-inductive ohmic resistance; of a high frequency transformer having its primary and secondary winding arranged in suitable close proximity to practically prevent a stray flux, the primary winding of said transformer being connected with said oscillation circuit and the secondary winding being connected with a circuit containing said detector.

4. In a circuit connection of the character described, the combination with an oscillation circuit and a circuit containing a detector constituting a non-inductive ohmic resistance and containing means for indicating electric oscillations; of a high frequency transformer having its primary and secondary winding arranged in suitable close proximity to practically prevent a stray flux, the primary winding of said transformer being connected with said oscillation circuit and the secondary winding being connected with a circuit containing said detector, and a variable alternating current resistance connected in parallel with one of the windings of said transformer.

5. In a circuit connection of the character described, the combination with an oscillation circuit and a circuit containing a detector constituting an ohmic resistance; of a high frequency transformer having its primary and secondary winding arranged in suitable close proximity to practically prevent a stray flux, the primary winding of said transformer being connected with said oscillation circuit, and the secondary winding being connected with a circuit containing said detector, said transformer having a suitable transformation ratio to cause the detector in the detector circuit to substantially double the damping of the circuit containing the primary winding of the transformer.

6. In a circuit connection of the character described, the combination with an oscillation circuit, a tuned intermediate circuit loosely coupled with said oscillation circuit and a detector circuit containing a detector constituting an ohmic resistance and means for indicating electric oscillations; of a high frequency transformer having its primary and secondary winding arranged in suitable close proximity to practically prevent a stray flux, the primary winding of said transformer being connected with said intermediate circuit and the secondary winding being connected with said detector circuit, and a variable alternating current resistance connected in parallel to one of the windings of said transformer.

In testimony whereof, I affix my signature in the presence of two witnesses.

RAGNAR HÅKAN RENDAHL.

Witnesses:
 GRETA PRICE,
 ERNEST L. HARRIS.